(12) United States Patent
Gao et al.

(10) Patent No.: US 7,870,594 B2
(45) Date of Patent: Jan. 11, 2011

(54) APPLYING COMPLIANCE STANDARDS TO A COMPUTER WITHIN A GROUPING HIERARCHY

(75) Inventors: Jingrong Gao, Richmond Hill (CA); Joseph Paul Wigglesworth, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 1087 days.

(21) Appl. No.: 11/561,694

(22) Filed: Nov. 20, 2006

(65) Prior Publication Data

US 2008/0120686 A1    May 22, 2008

(51) Int. Cl.
*G06F 17/00* (2006.01)
*G06F 7/04* (2006.01)
*G06F 9/00* (2006.01)

(52) U.S. Cl. ............. 726/1; 726/26; 713/1; 713/100
(58) Field of Classification Search ............ 726/1, 726/26; 713/1, 100
See application file for complete search history.

(56) References Cited

U.S. PATENT DOCUMENTS

| | | | |
|---|---|---|---|
| 6,070,244 | A | 5/2000 | Orchier et al. |
| 6,633,318 | B1 | 10/2003 | Kim et al. |
| 6,735,701 | B1 * | 5/2004 | Jacobson ............ 726/1 |
| 7,592,906 | B1 * | 9/2009 | Hanna et al. ............ 340/506 |
| 2002/0056046 | A1 | 5/2002 | Klein |
| 2002/0138786 | A1 * | 9/2002 | Chefalas et al. ............ 714/37 |
| 2003/0055944 | A1 | 3/2003 | Belovich |
| 2003/0065942 | A1 * | 4/2003 | Lineman et al. ........... 713/201 |
| 2003/0177389 | A1 | 9/2003 | Albert et al. |
| 2004/0103310 | A1 * | 5/2004 | Sobel et al. ............ 713/201 |
| 2004/0230828 | A1 * | 11/2004 | DeFuria et al. ............ 713/200 |
| 2005/0257244 | A1 | 11/2005 | Joly et al. |
| 2005/0257245 | A1 | 11/2005 | Patrick et al. |
| 2006/0010483 | A1 | 1/2006 | Buehler et al. |
| 2006/0143685 | A1 | 6/2006 | Vasishth et al. |
| 2008/0059123 | A1 * | 3/2008 | Estberg et al. ............ 702/188 |

* cited by examiner

*Primary Examiner*—Kambiz Zand
*Assistant Examiner*—Michael Guirguis
(74) *Attorney, Agent, or Firm*—Yee & Associates, P.C.; Jeffrey S. LaBaw

(57) ABSTRACT

A computer implemented method, data processing system, and computer usable program code are provided for applying compliance standards to a set of computers. A set of computer groupings containing the set of computers is identified. Each computer in the set of computers is included in at least one computer group in the set of computer groupings. A set of compliance rules is identified for each of the set of computer groupings. Configuration information for the set of computers is acquired and the configuration information for each of the set of computers is compared to the set of compliance rules for each of the set of computer groupings to which each computer in the set of computers is included. Compliance results are generated for each computer in the set of computers.

17 Claims, 4 Drawing Sheets

APPLYING COMPLIANCE STANDARDS TO A COMPUTER WITHIN A GROUPING HIERARCHY

BACKGROUND OF THE INVENTION

1. Field of the Invention

The present invention relates generally to applying computer standards. More specifically, the present invention relates to a computer implemented method, apparatus, and computer usable program code for applying compliance standards to a computer within a grouping hierarchy.

2. Description of the Related Art

Compliance is defined as being in accordance with established guidelines, specifications, or legislation or the process of becoming so. Software, for example, may be developed in compliance with specifications created by some standards body, such as the Institute of Electrical and Electronics Engineers (IEEE) and may be distributed in compliance with the vendor's licensing agreement.

Most companies today have some level of defined internal policies for information technology security, but many have insufficient mechanisms to measure compliance and enforce those policies. Existing compliance software enables a company to define a standard based on the operating system, applications, and vulnerabilities present on a particular host, quantify the business risk associated with that host, and then measure other hosts against that standard. Targets may then be set for continuous improvement, enabling greater security at lower costs.

Thus, most compliance products today ensure the compliance by reporting the compliance issues by either comparing with preset regulations or by comparing with a compliant golden standard. Using an existing solution to enforce the security and software compliance for all computers in the data center may be a difficult and complicated task. Due to the large number of computers, their different properties, and complicated usage cases, a different array of compliance check rules need to be applied to different sets of computers. Some computers fall into several compliance check sets and must meet different sets of compliance check rules. Thus, it is very difficult to define rules for all of the different systems.

SUMMARY OF THE INVENTION

A computer implemented method, data processing system, and computer usable program code are provided for applying compliance standards to a set of computers. The illustrative embodiments identify a set of computer groupings containing the set of computers. Each computer in the set of computers is included in at least one computer group in the set of computer groupings. The illustrative embodiments identify a set of compliance rules for each of the set of computer groupings. The illustrative embodiments acquire configuration information for the set of computers and compare the configuration information for each of the set of computers to the set of compliance rules for each of the set of computer groupings to which each computer in the set of computers is included. The illustrative embodiments generate compliance results for each computer in the set of computers.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
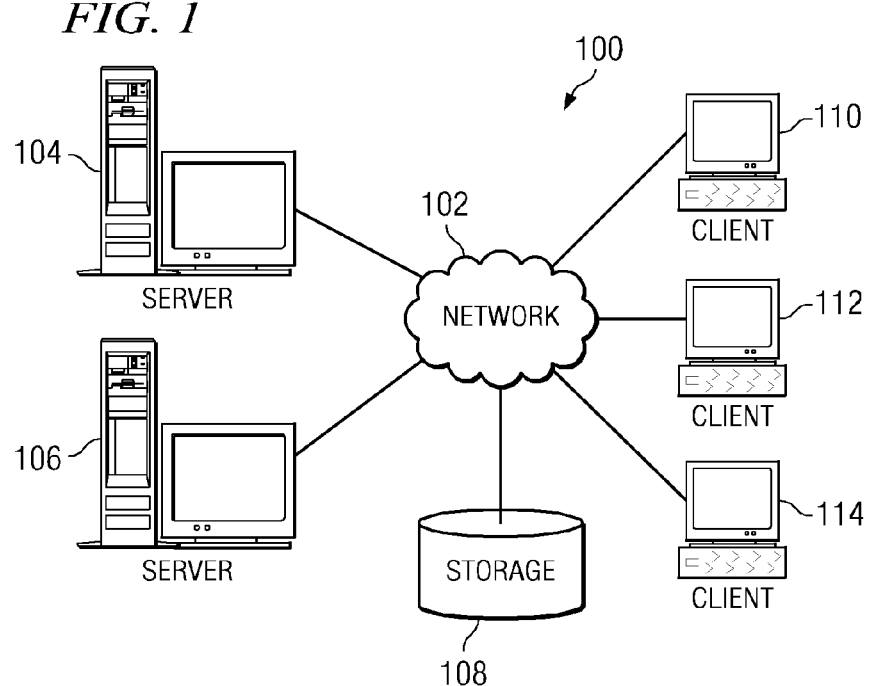
FIG. 1 depicts a pictorial representation of a network of data processing systems in which the illustrative embodiments may be implemented.
Figure 2:
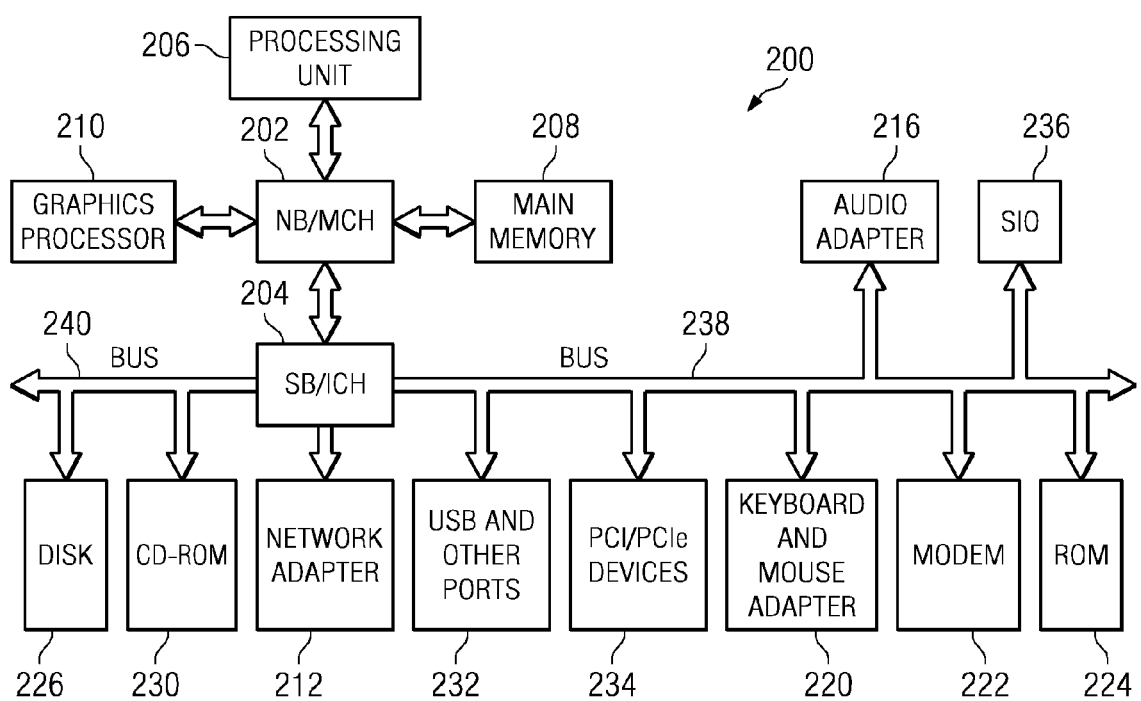
FIG. 2 shows a block diagram of a data processing system in which the illustrative embodiments may be implemented.

The illustrative embodiments provide for applying compliance standards to a computer within a grouping hierarchy. With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which the illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, apparatus, and computer usable program code for an innovative way for defining the compliance check rules on computer group structures. A process to enforce the compliance check rules is defined at a computer group level and is applied to all members of the computer group level through hierarchical computer grouping structures. Using this solution, users are able to define hierarchical computer grouping structures. Compliance check rules are a set of rules used to determine whether a computer or group of computers is compliant or not. There are two types of compliance check rules: security and software. Security compliance check rules are used to check for a variety of security issues, such as whether appropriate passwords have been set, for example, power-on, hard disk, keyboard, and screen passwords or whether improper settings, such as audit or computer logging settings have been set. Software compliance rules are used to check whether certain software applications should be on a computer or not. Using software compliance check rules, a user may specify whether software is optional, required, or prohibited on a target machine. Compliance check rules may be defined on all computer group levels and computers themselves. The compliance check rules defined on the computer itself will only be checked against the computer itself, while the compliance check rules defined on the various computer group levels will be checked against all the computers that are members of the computer group either directly or indirectly through sub-groups.

The illustrative embodiments provide for enforcing a computer's compliance using different compliance standards. To achieve this, a user may simply define different computer groups that the user's computer should belong to, assign the computer as the group member, and then create the compliance check rules on the group level. In this way, the computer will inherit all compliance check rules of all the computer groups it belongs to and be enforced to compliance according to all these compliance check rules.

Figure 3:
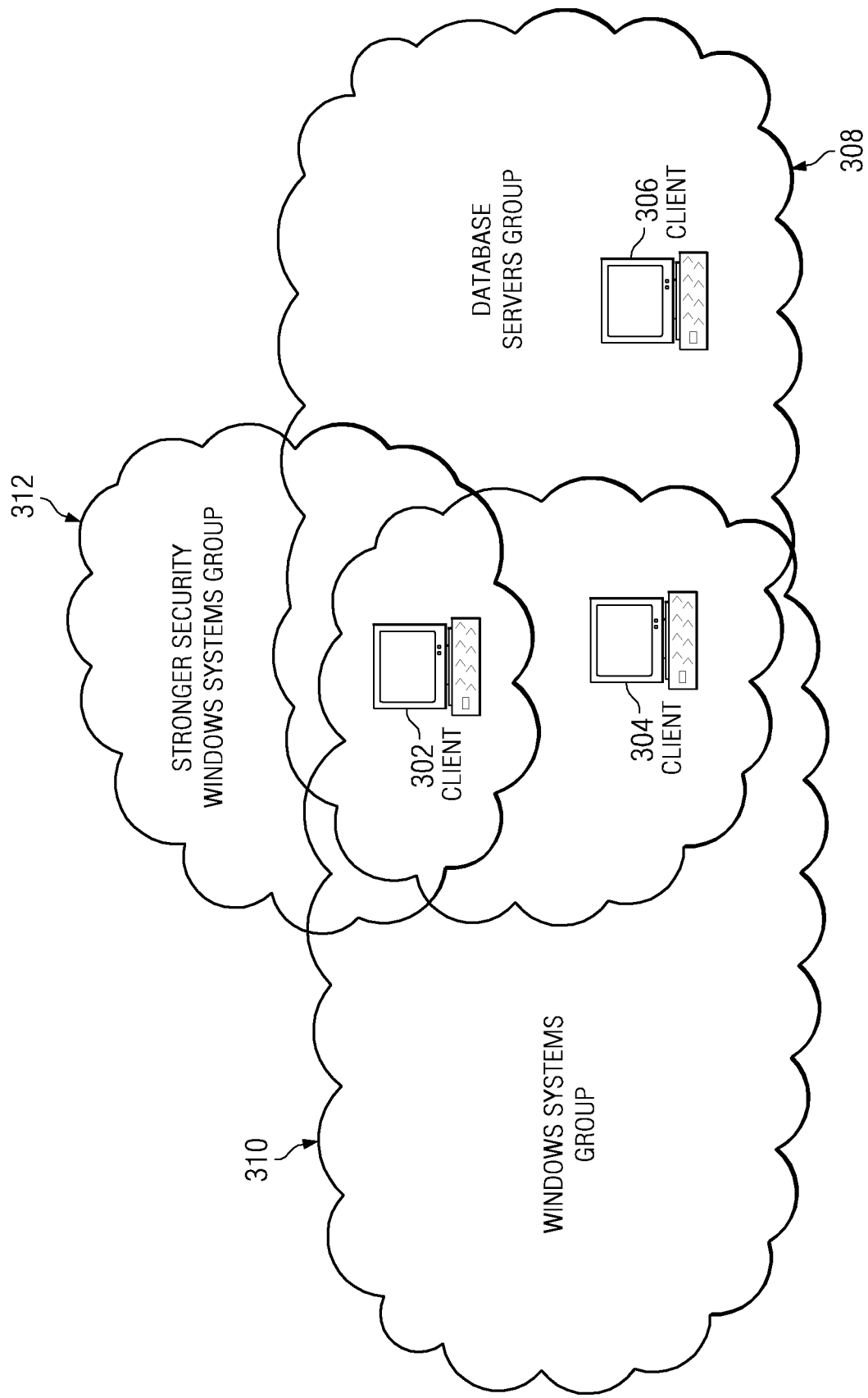
FIG. 3 illustrates an exemplary grouping of computers in accordance with an illustrative embodiment.

FIG. 3 illustrates an exemplary grouping of computers in accordance with an illustrative embodiment. Clients 302, 304, and 306 may fall into different groups depending on each of clients' 302, 304, or 306 operating system, installed applications, and usage security level. Clients 302, 304, and 306 are client computers, such as clients 110, 112, and 114 of FIG. 1. Clients 302, 304, and 306 are shown in database servers group 308 and are all used as database servers. Of these, clients 302 and 304 are part of Windows systems group 310 because they are running the Windows operating system. Additionally, client 302 is part of stronger security Windows system group 312 because client 302 requires stronger security enforcement due to sensitive data that client 302 stores.

In this illustration, even though clients 302, 304, and 306 all serve as database servers and adhere to the same database server compliance check rules of database servers group 308, clients 302 and 304 also adhere to the compliance check rules that apply to all Windows systems in Windows systems group 310. Client's 302 compliance requirement is stronger still: not only must client 302 adhere to the compliance check rules for database servers of database servers group 308 and Windows systems of Windows systems group 310, but client 302 must also adhere to the stronger security Windows systems compliance check rules of stronger security Windows system group 312. While FIG. 3 only shows three clients and three groupings, any number of clients and any number of groupings may be supported by the illustrative embodiments.

Figure 4:
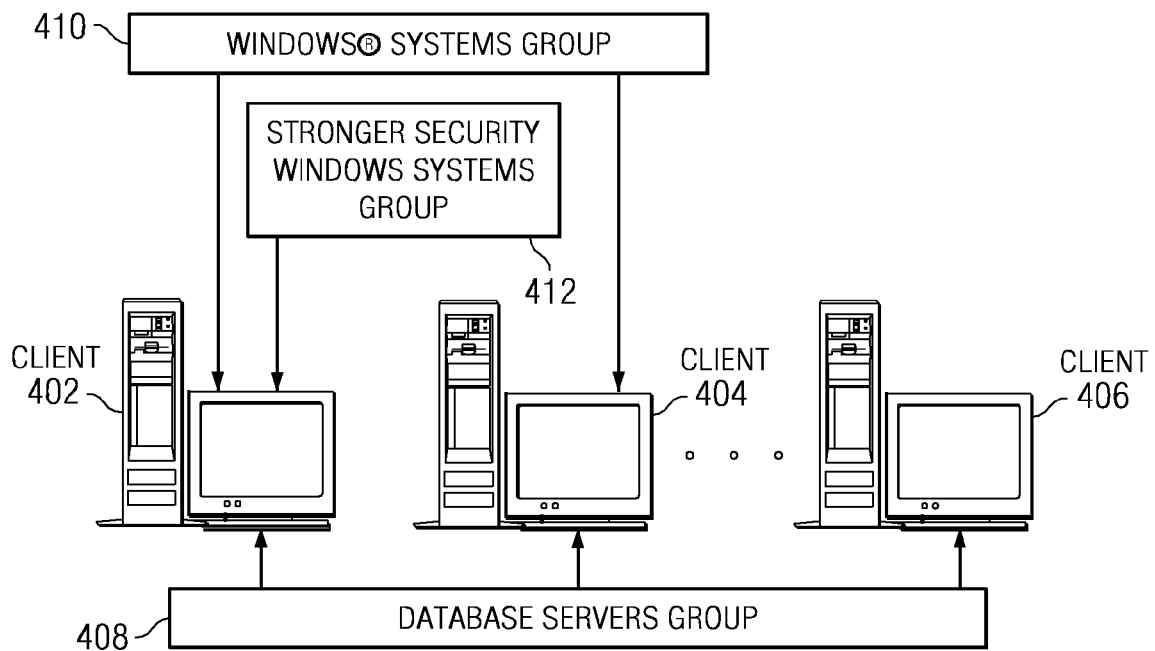
FIG. 4 depicts an exemplary creation of computer groups and an exemplary assignment of compliance check rules to each computer grouping in accordance with an illustrative embodiment.

FIG. 4 depicts an exemplary creation of computer groups and an exemplary assignment of compliance check rules to each computer grouping in accordance with an illustrative embodiment. FIG. 4 includes three client computers, clients 402, 404, and 406; and three computer groups, database servers group 408, Windows systems group 410, and stronger security Windows system group 412. Clients 402, 404, and 406 are client computers, such as clients 302, 304, and 306 of FIG. 3. In these examples, the three computer groups, database servers group 408, Windows systems group 410, and stronger security Windows system group 412 are computer groups, such as database servers group 308, Windows systems group 310, and stronger security Windows system group 312. In the exemplary illustration, client 406 inherits compliance check rules from database servers group 408. The exemplary compliance check rules for database servers group 408 are as follows:

1. IBM® DB2® 8.2 must be installed; and
2. DB2 service must be started.

IBM and DB2 are trademarks of International Business Machines Corporation in the United States, other countries, or both. Client 404 inherits the compliance check rules from database servers group 408 in addition to the compliance check rules for Windows system group 410. The exemplary compliance check rules for database servers group 408 and Windows systems group 410 are as follows:

1. DB2 8.2 must be installed;
2. DB2 service must be started;
3. Power-on password must be on;
4. User password minimum length is seven;
5. User screen saver must be active; and
6. User screen saver has time out value of twenty minutes.

Client 402 inherits the compliance check rules from database servers group 408 and Windows system group 410, in addition to stronger security Windows system group 412. The exemplary compliance check rules for database servers group 408, Windows system group 410 and stronger security Windows system group 412 are as follows:

1. DB2 8.2 must be installed;
2. DB2 service must be started;
3. Power-on password must be on;
4. User password minimum length is seven;
5. User screen saver must be active;
6 User screen saver has time out value of twenty minutes;
7. User password minimum length is nine; and
8. User screen saver has time out value of five minutes.

The compliance check rules shown within database servers group 408, Windows system group 410 and stronger security Windows system group 412 are merely exemplary. The user or administer may define any compliance check rule for any group. While clients 402, 404, and 406 are shown within their illustrative groups, clients 402, 404, and 406 may be part of one or more of numerous groups.

Figure 5:
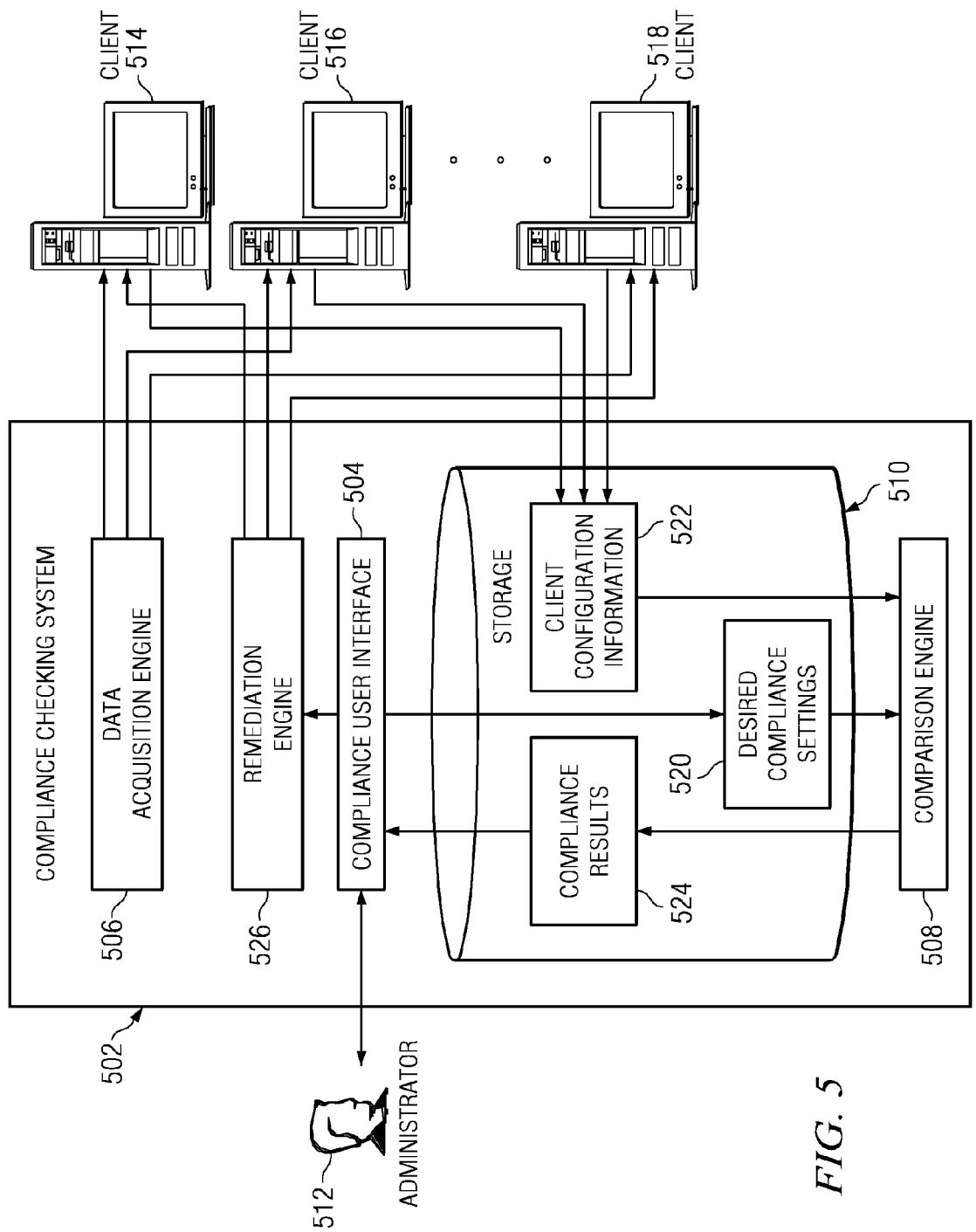
FIG. 5 illustrates a compliance checking system in accordance with an illustrative embodiment.

FIG. 5 illustrates a compliance checking system in accordance with an illustrative embodiment. Compliance checking system 502 includes compliance user interface 504, data acquisition engine 506, comparison engine 508, and storage 510. Compliance user interface 504 provides an interface for administrator 512 to create computer groups and assign compliance check rules, such as those described in FIG. 4. Administrator 512 may define compliance check rules for computer groups or on individual clients. The compliance check rules, as well as the groups in which each of clients 514, 516, and 518 are part of, are stored on storage 510 in desired compliance settings 520.

Data acquisition engine 506 obtains actual configuration information from each of clients 514, 516, and 518. Data acquisition engine 506 may use agents that are pre-installed on clients 514, 516 and 518 to gather the actual configuration information. The actual configuration information is stored on storage 510 in client configuration information 522. Actual client configuration information acquirement may be initiated by a trigger from compliance user interface 504 or may be automatically acquired based on a scheduled time. Comparison engine 508 performs a comparison between desired compliance settings 520 and respective client configuration information 522 to produce the compliant and violated compliance results. Comparison engine 508 generates the compliance results and determines associated recommendations to resolve identified violations of compliance. The compliance results are stored on storage 510 as compliance results 524.

Administrator 512 may review compliance results 524 using compliance user interface 504. Compliance results 524 provide an analysis of each compliance check rule for each of clients 514, 516, and 518. For each compliance result, there may be multiple violations. For each violation, comparison engine 508 generates a recommendation to resolve the violation. A recommendation to resolve an identified compliance violation is based on the compliance check rules and the deviation from the compliance check rules that resulted in the violation. For example, if the user has set the client screen saver time out value to thirty minutes, and the compliance rule states the client screen saver should have a time out value of five minutes, then the compliance rule is in violation, and the associated recommendation is to set the screen saver to five minutes. Administrator 512 may remedy any specific violation using remediation engine 526.

A logical operation within remediation engine 526 is the interface to fix a compliance violation. Various workflows implementing this logical operation may be written to fix the problem. In general, the workflow may get the desired setting information from the recommendation and use it to programmatically resolve the violation in the computer. Some examples of remediation programs that run on a computer are commands, scripts, and Java™ programs. The user may use compliance user interface 504 to assign the specific workflows to a recommendation. The programmatic remediate process will perform the remediate workflow associated with the recommendation. Thus, remediation engine 526 may programmatically resolve a specific violation using standard vendor provided fixes for the specific software application or operating system or fixes specified by the user.

Figure 6:
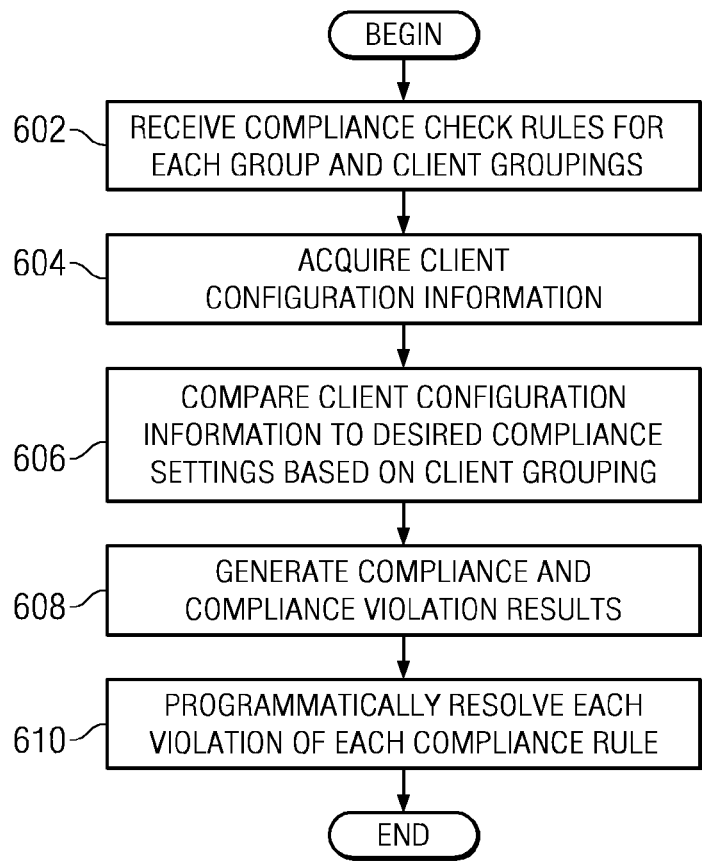
FIG. 6 depicts a flowchart of the compliance checking operation in accordance with an illustrative embodiment.

FIG. 6 depicts a flowchart of the compliance checking operation in accordance with an illustrative embodiment, such as compliance checking system 502 of FIG. 5.

The process begins by identifying group compliance check rules and client groupings from a user (step 602). The group compliance check rules and client groupings may be identified by receiving the information from a user or searching for the information from a file, such as a configuration file. The user may define compliance check rules for computer groups or for individual clients to form desired compliance settings for each client. The compliance checking system obtains actual configuration information for each client in the client groupings (step 604). The compliance checking system may use agents that are pre-installed on the clients to gather the actual configuration information. Actual client configuration information acquirement may be initiated by a trigger from the user or may be programmatically acquired based on a scheduled time.

The compliance checking system performs a comparison between the client configuration information and the desired compliance settings (step 606). Comparing the client configuration information to the desired compliance settings verifies that each compliance rule is being adhered to. For example, if the user has set the client screen saver time out value to thirty minutes and the compliance rule states the client screen saver should have a time out value of five minutes, then the compliance rule is in violation. The compliance checking system then produces compliance and compliance violation results (step 608). The compliance and compliance violation results detail each compliance and violation and provides recommendations on how to resolve violations of compliance. Using the recommendations, the remediation engine programmatically resolves each violation of each compliance rule (step 610), with the operation terminating thereafter. The remediation engine uses standard vendor provided fixes for the specific software application or operating system or fixes specified by the user to programmatically resolve each specific violation of each compliance rule.

Thus, the illustrative embodiments provide for enforcing a computer's compliance using different compliance check rules. An administrator simply defines different computer groups that the user's computers should belong to, assigns the user's computer to different computer groups, and creates compliance check rules on the different groups. In this way, the user's computer will inherit all compliance check rules of all the computer groups it belongs to and be enforced to compliance according to all these compliance check rules.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for applying compliance standards to a set of computers, the computer implemented method comprising:

identifying a set of computer groupings containing the set of computers, wherein each computer in the set of computers is included in at least one computer group in the set of computer groupings;

identifying a set of compliance rules for each of the set of computer groupings;

identifying a set of computer specific compliance rules for a specific computer in the set of computers;

acquiring configuration information for the set of computers;

comparing the configuration information for each of the set of computers to the set of compliance rules for each of the set of computer groupings to which each computer in the set of computers is included, and comparing the configuration information for the specific computer to the set of computer specific compliance rules for the specific computer; and generating compliance results for each computer in the set of computers, including generating the compliance results associated with the set of computer specific compliance rules for the specific computer;

wherein at least one computer in the set of computers is included in at least two computer groups in the set of computer groupings, and wherein the compliance results includes a compliance for each compliance rule for which each computer in the set of computers is compliant with, including a group compliance associated with each of the set of computer groupings to which each computer in the set of computers is included.

2. The computer implemented method of claim 1, wherein the compliance results includes at least one violation of a compliance rule for which each computer in the set of computers is required to comply.

3. The computer implemented method of claim 2, wherein the compliance results includes recommendations to resolve the at least one violation.

4. The computer implemented method of claim 1, further comprising:
   inheriting, by the at least one computer, the set of compliance rules for each of the set of computer groupings to which the at least one computer is included.

5. The computer implemented method of claim 1, wherein generating the compliance results for each computer in the set of computers comprises:
   identifying the configuration information for each of the set of computers;
   identifying the set of compliance rules for each of the set of computer groupings to which each computer in the set of computers is included; and
   identifying the compliance results for each of the set of compliance rules, wherein the compliance results is at least one of a violation of a specific compliance rule and a compliance with the specific compliance rule.

6. The computer implemented method of claim 4, further comprising:
   programmatically resolving the at least one violation of each compliance rule on each computer in the set of computers.

7. The computer implemented method of claim 6, wherein resolving the at least one violation uses standard vendor-provided fixes for a specific software application or an operating system in violation.

8. A data processing system comprising:
   a bus system;
   a communications system connected to the bus system;
   a memory connected to the bus system, wherein the memory includes a set of instructions; and
   a processing unit connected to the bus system, wherein the processing unit executes the set of instructions to identify a set of computer groupings containing a set of computers, wherein each computer in the set of computers is included in at least one computer group in the set of computer groupings, and wherein at least one computer in the set of computers is included in at least two computer groups in the set of computer groupings; identify a set of compliance rules for each of the set of computer groupings; receive a set of computer specific compliance rules for a specific computer in the set of computers; acquire configuration information for the set of computers; compare the configuration information for each of the set of computers to the set of compliance rules for each of the set of computer groupings to which each computer in the set of computers is included and compare the configuration information for the specific computer to the set of computer specific compliance rules for the specific computer; and generate compliance results for each computer in the set of computers, including a group compliance associated with each of the set of computer groupings to which each computer in the set of computers is included, wherein the compliance results includes a compliance for each compliance rule for which each computer in the set of computers is compliant with, including compliance results associated with the set of computer specific compliance rules for the specific computer.

9. The data processing system of claim 8, wherein the compliance results includes at least one violation of a compliance rule for which each computer in the set of computers is required to comply and wherein the compliance results includes recommendations to resolve the respective at least one violation.

10. The data processing system of claim 8, wherein the processing unit further executes the set of instructions to inherit, by the at least one computer, the set of compliance rules for each of the set of computer groupings to which the at least one computer is included receive a set of computer specific compliance rules for a specific computer in the set of computers; compare the configuration information for the specific computer to the set of computer specific compliance rules for the specific computer; and generate the compliance results for the specific computer.

11. The data processing system of claim 8, wherein the processing unit executing the set of instructions to generate the compliance results for each computer in the set of computers includes the processing unit further executing the set of instructions to identify the configuration information for each of the set of computers;
   identify the set of compliance rules for each of the set of computer groupings to which each computer in the set of computers is included; and identify the compliance results for each of the set of compliance rules, wherein the compliance results is at least one of a violation of a specific compliance rule and a compliance with the specific compliance rule.

12. The data processing system of claim 9, wherein the processing unit further executes the set of instructions to programmatically resolve the at least one violation of each compliance rule on each computer in the set of computers, wherein resolving the at least one violation uses standard vendor-provided fixes for a specific software application or an operating system in violation.

13. A computer program product comprising:
   a non-transitory computer usable storage medium including computer usable program code stored thereon for applying compliance standards to a set of computers, the computer program product including:
   computer usable program code for identifying a set of computer groupings containing the set of computers, wherein each computer in the set of computers is included in at least one computer group in the set of computer groupings;
   computer usable program code for identifying a set of compliance rules for each of the set of computer groupings;
   computer usable program code for identifying a set of computer specific compliance rules for a specific computer in the set of computers;
   computer usable program code for acquiring configuration information for the set of computers;
   computer usable program code for comparing the configuration information for each of the set of computers to the set of compliance rules for each of the set of computer groupings to which each computer in the set of computers is included, and comparing the configuration information for the specific computer to the set of computer specific compliance rules for the specific computer; and
   computer usable program code for generating compliance results for each computer in the set of computers, including generating the compliance results associated with the set of computer specific compliance rules for the specific computer;

wherein at least one computer in the set of computers is included in at least two computer groups in the set of computer groupings, and wherein the compliance results includes a compliance for each compliance rule for which each computer in the set of computers is compliant with, including a group compliance associated with each of the set of computer groupings to which each computer in the set of computers is included.

14. The computer program product of claim 13, wherein the compliance results includes at least one violation of a compliance rule for which each computer in the set of computers is required to comply and wherein the compliance results includes recommendations to resolve the at least one violation.

15. The computer program product of claim 13, further including:
   computer usable program code for inheriting, by the at least one computer, the set of compliance rules for each of the set of computer groupings to which the at least one computer is included.

16. The computer program product of claim 13, wherein the computer usable program code for generating the compliance results for each computer in the set of computers includes:
   computer usable program code for identifying the configuration information for each of the set of computers;
   computer usable program code for identifying the set of compliance rules for each of the set of computer groupings to which each computer in the set of computers is included; and
   computer usable program code for identifying the compliance results for each of the set of compliance rules, wherein the compliance results is at least one of a violation of a specific compliance rule or a compliance with the specific compliance rule.

17. The computer program product of claim 15, further including:
   computer usable program code for programmatically resolving the at least one violation for each compliance rule on each computer in the set of computers, wherein resolving the at least one violation uses standard vendor-provided fixes for a specific software application or an operating system in violation.

* * * * *